(12) United States Patent
Errickson, Jr.

(10) Patent No.: US 11,447,200 B2
(45) Date of Patent: Sep. 20, 2022

(54) MOTORCYCLE LOCKING SYSTEM

(71) Applicant: Michael W. Errickson, Jr., Millville, NJ (US)

(72) Inventor: Michael W. Errickson, Jr., Millville, NJ (US)

( * ) Notice: Subject to any disclaimer, the term of this patent is extended or adjusted under 35 U.S.C. 154(b) by 784 days.

(21) Appl. No.: 16/390,086

(22) Filed: Apr. 22, 2019

(65) Prior Publication Data
US 2020/0331551 A1 Oct. 22, 2020

(51) Int. Cl.
*B62H 5/14* (2006.01)
*B62H 3/08* (2006.01)

(52) U.S. Cl.
CPC ............... *B62H 5/145* (2013.01); *B62H 3/08* (2013.01); *B62H 5/148* (2013.01); *B62H 2700/005* (2013.01)

(58) Field of Classification Search
CPC .......... B62H 5/14; B62H 5/141; B62H 5/142; B62H 5/145; B62H 5/147; B62H 5/148; B62H 2700/005; B62H 3/00; B62H 3/04; B62H 3/06; B62H 3/08; B62H 3/12
See application file for complete search history.

(56) References Cited

U.S. PATENT DOCUMENTS

| | | | | |
|---|---|---|---|---|
| 577,993 A * | 3/1897 | Thurston | ................... | B62H 3/00 211/8 |
| 597,507 A * | 1/1898 | McIntosh | ................. | B62H 3/12 211/5 |
| 605,628 A * | 6/1898 | Bradley | .................... | B62H 3/00 D12/115 |
| 3,912,139 A * | 10/1975 | Bowman | .................. | B60R 9/10 224/403 |
| 3,964,611 A * | 6/1976 | Galen | ..................... | E05B 71/00 211/8 |
| 4,032,167 A * | 6/1977 | Chereda | .................... | B60P 3/07 280/789 |
| 4,050,583 A * | 9/1977 | Szabo | ...................... | B62H 3/08 211/20 |
| 4,442,961 A * | 4/1984 | Bott | ........................ | B62H 3/08 224/570 |
| D298,524 S * | 11/1988 | De Luca | ...................... | D12/115 |
| 5,246,120 A * | 9/1993 | Walker | ..................... | B62H 3/12 211/21 |
| 5,257,517 A * | 11/1993 | Dale | ....................... | E05B 67/02 70/416 |

(Continued)

*Primary Examiner* — Patrick D Hawn
(74) *Attorney, Agent, or Firm* — Stuart M. Goldstein

(57) ABSTRACT

A system for locking the wheel of a motorcycle and hence the motorcycle itself utilizes a locking housing with a back wall, dual sidewalls, and a bottom floor which partially circumscribe a slotted space for receiving the Wheel of a motorcycle. The bottom floor has lateral sections extending outside the sidewalls. A locking base is provided which has rail members extending along the side of the base, the rail members being configured to slidably receive the lateral sections of the bottom floor. Bolts secure the locking housing to the locking base when the system is assembled to receive the front wheel of a motorcycle. An elongated cycle lock is provided to extend through holes in the sidewalls and the motorcycle wheel positioned within the slotted space, to secure the wheel and thus the motorcycle within the locking housing.

3 Claims, 4 Drawing Sheets

(56) References Cited

U.S. PATENT DOCUMENTS

| | | | | |
|---|---|---|---|---|
| 5,549,231 | A * | 8/1996 | Fletcher | B60R 9/06 |
| | | | | 211/20 |
| 5,702,007 | A * | 12/1997 | Fritz | B62H 3/08 |
| | | | | 211/20 |
| 5,934,863 | A * | 8/1999 | Beck | B60P 3/1058 |
| | | | | 414/813 |
| 6,287,069 | B1 * | 9/2001 | Oliphant | B60P 3/122 |
| | | | | 414/430 |
| 6,331,094 | B1 * | 12/2001 | Burrows | B60P 3/077 |
| | | | | 410/3 |
| 6,394,283 | B1 * | 5/2002 | Fletcher | B62H 3/08 |
| | | | | 211/20 |
| 6,478,525 | B2 * | 11/2002 | Hageman | B65G 69/005 |
| | | | | 414/584 |
| 6,755,599 | B1 * | 6/2004 | Plyler | B60T 3/00 |
| | | | | 211/21 |
| 9,409,508 | B2 * | 8/2016 | Graham | B62H 3/04 |
| 9,550,444 | B1 * | 1/2017 | Ferreira | B60P 3/077 |
| 10,160,398 | B2 * | 12/2018 | Lee | B60P 3/077 |
| 10,569,689 | B2 * | 2/2020 | Johnson | B60P 3/06 |
| 10,611,421 | B2 * | 4/2020 | Rauba | B62H 3/12 |
| 10,641,014 | B2 * | 5/2020 | Tepper | G07C 9/33 |
| 11,104,259 | B2 * | 8/2021 | Wurm | B60P 3/077 |
| 2005/0121867 | A1 * | 6/2005 | Brien | B25H 1/0014 |
| | | | | 280/47.24 |
| 2005/0262909 | A1 * | 12/2005 | Brooks | B62H 3/08 |
| | | | | 70/227 |
| 2021/0171143 | A1 * | 6/2021 | Hatch | A63B 71/022 |

* cited by examiner

MOTORCYCLE LOCKING SYSTEM

FIELD OF THE INVENTION

The present invention relates to securing and locking parked motorcycles to prevent their unauthorized removal and use.

BACKGROUND OF THE INVENTION

Motorcycles, and especially current models, are high performance, expensive vehicles. As a result, motorcycle owners are constantly concerned about the safety of their vehicles, including the potential for theft when cycles are parked or otherwise left unattended.

While there have been a number of attempts to provide effective motorcycle locks and locking systems, most have significant drawbacks. For example, many locks are just not strong or hefty enough to keep a thief from easily removing the lock or merely absconding with both the cycle and the lock. Other locks and locking devices have a number of components and thus are quite complex, such that they are not only difficult and cumbersome to operate, but are also expensive to manufacture. There are currently no motorcycle locking systems which are effective in preventing theft, are easy to use, and are inexpensive to fabricate.

SUMMARY OF THE INVENTION

It is thus the object of the present invention to provide a motorcycle locking system which overcomes to limitations and disadvantages of current motorcycle locks, locking devices, and locking systems.

This and other objects are accomplished by the present invention, a system for locking the wheel of a motorcycle and hence the motorcycle itself comprising a locking housing with a back wall, dual sidewalls, and a bottom floor which partially circumscribe a slotted space for receiving the wheel of a motorcycle. The bottom floor has lateral sections extending outside the sidewalls. A locking base is provided which has rail members extending along the side of the base, the rail members being configured to slidably receive the lateral sections of the bottom floor. Attachments in the form of bolts secure the locking housing to the locking base when the system is assembled to receive the front Wheel of a motorcycle. An elongated cycle lock is provided to extend through holes in the sidewalls and a motorcycle wheel which is positioned within the slotted space, to secure the wheel and thus the motorcycle within the locking housing.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
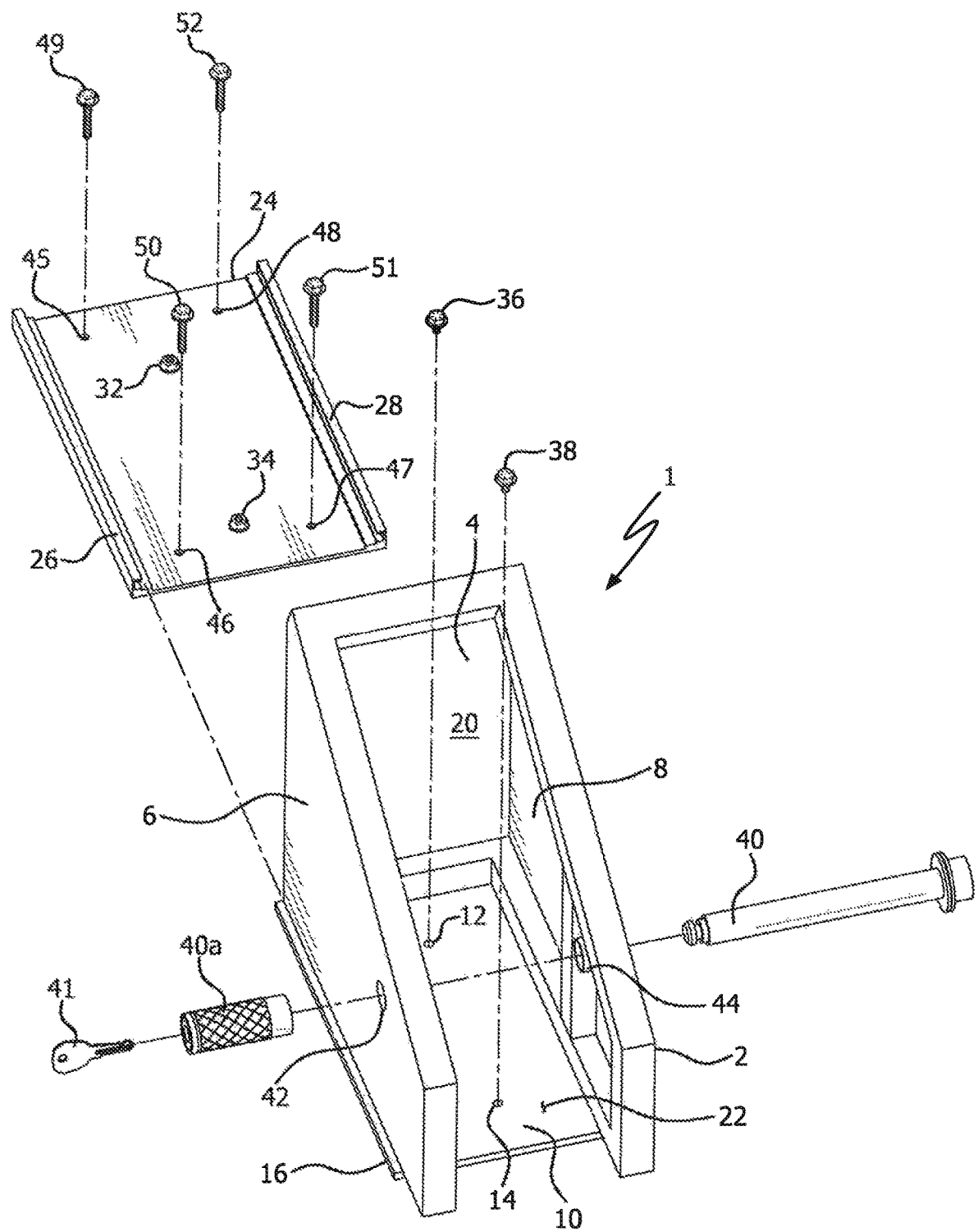
FIG. 1 is an exploded view of the components of the motorcycle locking system of the present invention.
Figure 2:
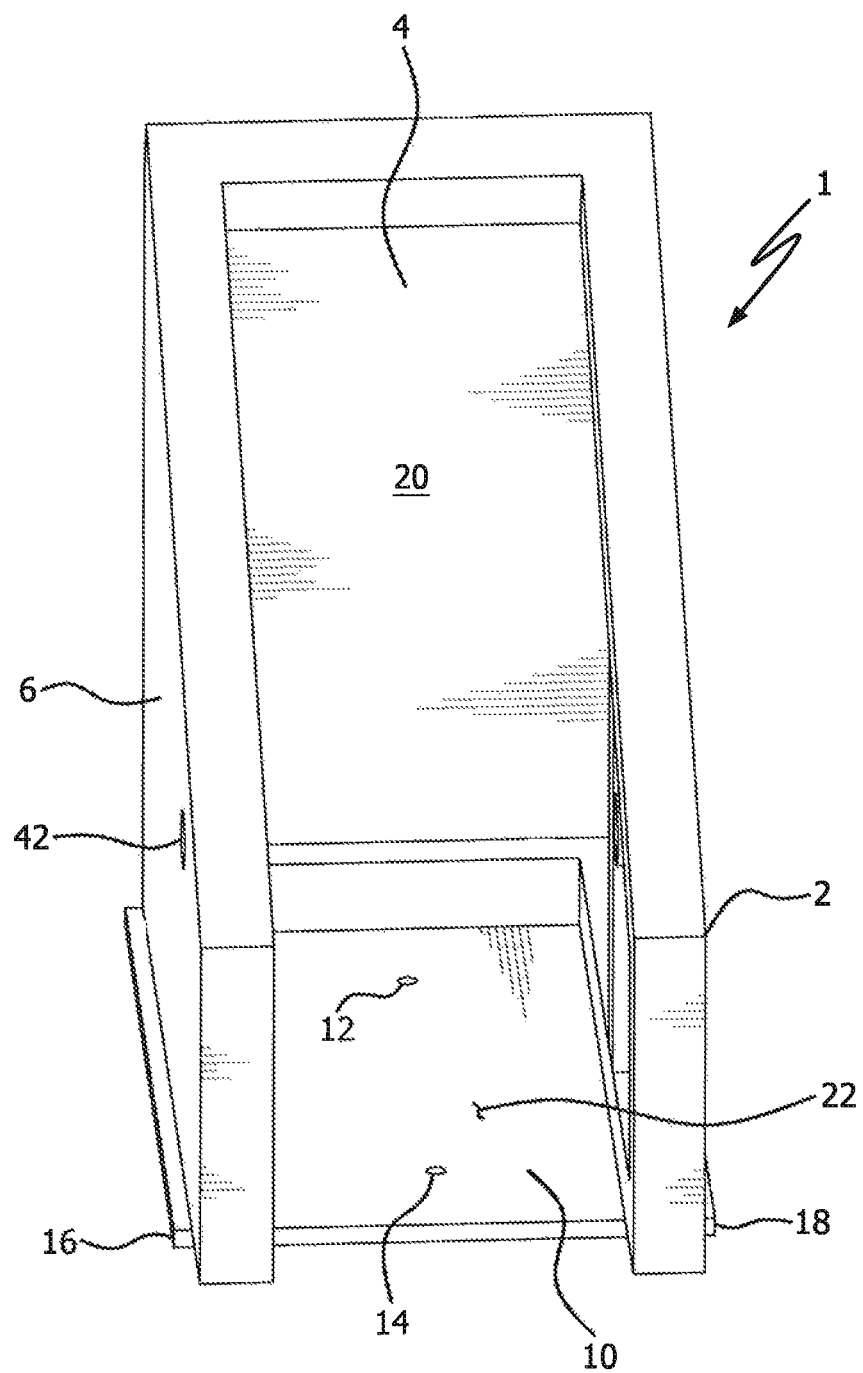
FIG. 2 is a partial front view of the locking housing of the motorcycle locking system of the present invention.
Figure 3:
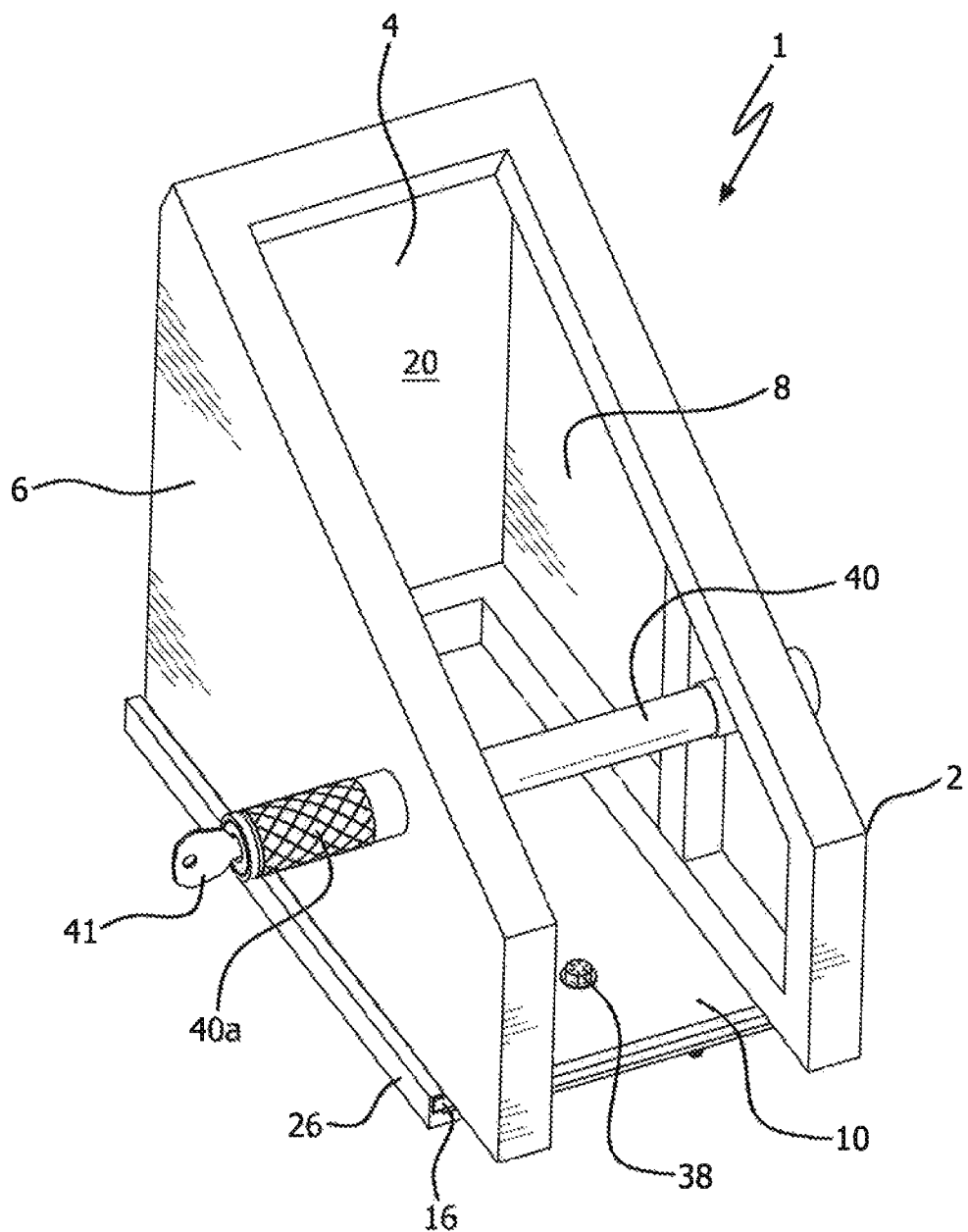
FIG. 3 is a top perspective view of the motorcycle locking system of the present invention, in its fully assembled state.
Figure 4:
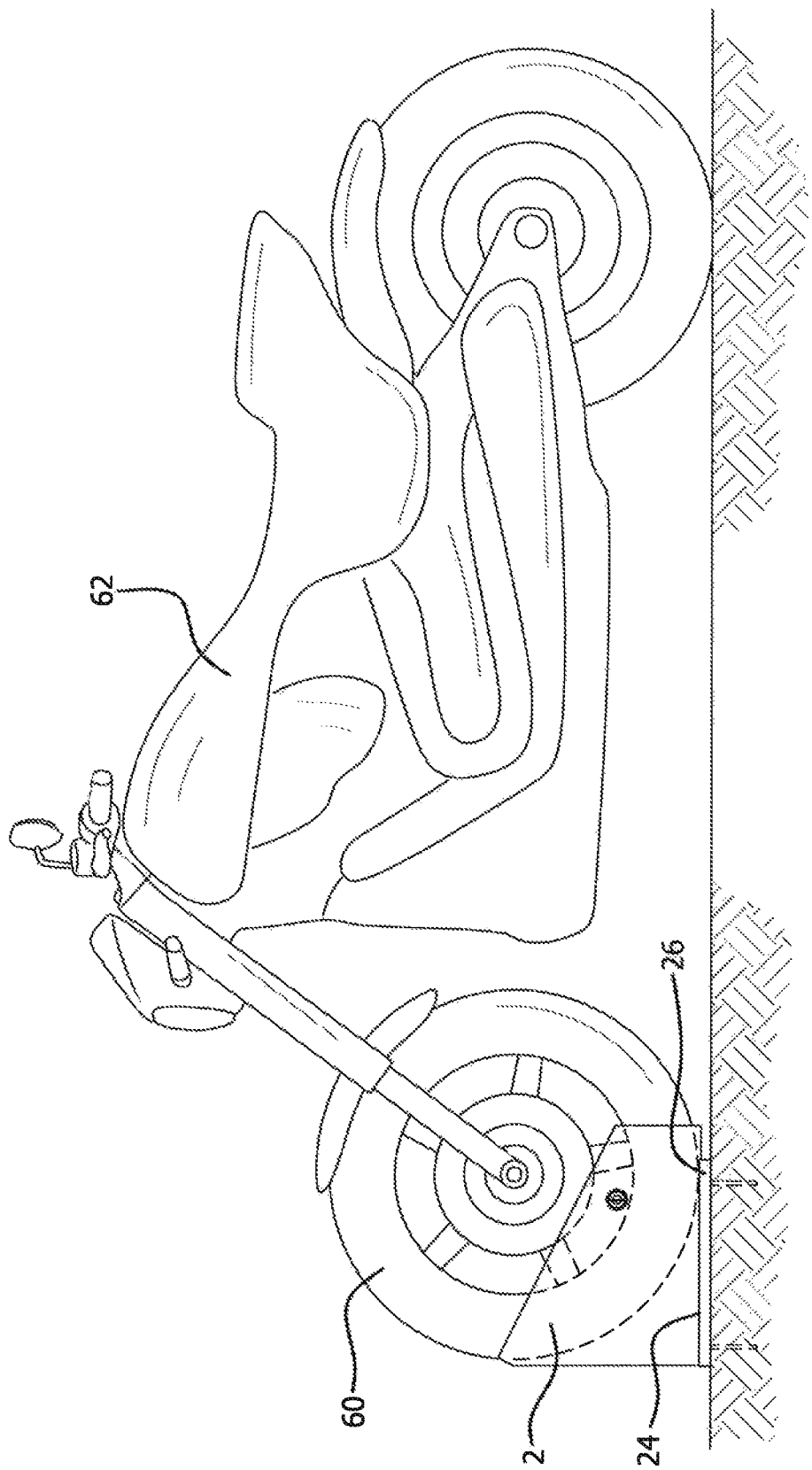
FIG. 4 illustrates the manner in Which the wheel of a motorcycle is secured and locked within the motorcycle locking system of the present invention.

The motorcycle locking system 1 of the present invention comprises locking housing 2 having back wall 4, sidewalls 6 and 8 extending outwardly from the back wall, and bottom floor 10 located below sidewalls 6 and 8. Holes 12 and 14 extend through the bottom floor 10. Lateral sections 16 and 18 of bottom floor 10 extend outside sidewalls 6 and 8. Slotted space 20 is partially circumscribed by sidewalls 6 and 8, back wall 4, and bottom floor 10, Slotted space 20 has front opening 22.

Rail members 26 and 28 extend laterally along the length of locking base 24. Bolt receiving nuts 32 and 34 are positioned in holes which extend into locking base 24.

In the connected position in which the locking system is poised to receive wheel 60 of motorcycle 62, locking housing 2 is located atop locking base 24 and lateral sections 16 and 18 of bottom floor 10 are located within rail members 26 and 28 of the locking base. In this position, holes 12 and 14 through bottom floor 10 are aligned with holes 32 and 34 of locking base 24. Bolts 36 and 38 are then inserted into and tightened within holes 12 and 32, and 14 and 34, in order to secure locking housing 2 to locking base 24.

Wheel 60 can then be guided into and through front opening 22 of slotted space 20. An elongated cycle lock 40 is inserted through side hole 42 in sidewall 6, through wheel 60, and then through side hole 44 in sidewall 8, to lock motorcycle 62 in place by means of connecting lock 40a and key 41.

Holes 45, 46, 47, and 48 are provided to secure locking base 24 to the floor or wall, by use of bolts or equivalent attachment devices.

If desired, locking housing 2 and locking base 24 can be disconnected into a detached position. By simply removing bolts 36 and 38 and sliding locking housing 2 and its lateral sections 16 and 18 out of rail members 26 and 28 of locking base 24, the locking base and the locking housing can be separated.

It is contemplated that both locking housing 2 and locking base 24 will be fabricated of steel or equivalent durable, heavy material. As such, even when the locking housing and locking base are not secured to a wall or floor, removing a motorcycle locked in the locking house will be most difficult.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A system for locking the wheel of a motorcycle, the system comprising:
a locking housing having a back wall and dual sidewalls extending outwardly from the back wall and terminating at the distal end of the housing, a bottom floor located below the sidewalls, the bottom floor having lateral sections which are part of the bottom floor and which extend outside the sidewalls from the back wall forward toward the distal end of the housing, and a slotted space partially circumscribed by the back wall, sidewalls, and bottom floor for receiving the wheel of a motorcycle, said space having a front opening;

a locking base having the same size and shape as the bottom floor of the housing, the locking base comprising rail members which are part of and extend along the sides of the base, the rail members being configured to slidably receive the lateral sections of the bottom floor, whereby in a connected position, the entire locking base is located beneath locking housing and the lateral sections are located within the rail members, and in a detached position the lateral sections are slid out of the rail members, separating the locking housing and the locking base;

attachment means to secure the locking housing to the locking base in the connected position; and locking means to secure the motorcycle wheel within the space.

2. The system as in claim 1 wherein the attachment means comprises holes in the locking base aligned with holes in the bottom floor and removeable bolts extending through the aligned holes.

3. The system as in claim 1 further comprising side holes through the sidewalls and wherein the locking means comprises a cycle lock extending through the side holes and the motorcycle wheel located in the space in said connected position.

\* \* \* \* \*